(12) United States Patent
Bruyneel et al.

(10) Patent No.: US 8,016,317 B1
(45) Date of Patent: Sep. 13, 2011

(54) AIRBAG ASSEMBLY

(75) Inventors: Nicholas George Bruyneel, Ortonville, MI (US); Brian Charles Serra, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/659,457

(22) Filed: Mar. 9, 2010

(51) Int. Cl.
*B60R 21/16* (2006.01)

(52) U.S. Cl. .................. 280/728.2; 280/728.3; 280/732

(58) Field of Classification Search ............... 280/728.3, 280/732, 728.2
See application file for complete search history.

(56) References Cited

U.S. PATENT DOCUMENTS

| | | | |
|---|---|---|---|
| 5,405,164 A * | 4/1995 | Paxton et al. | 280/728.2 |
| 5,577,764 A * | 11/1996 | Webber et al. | 280/728.2 |
| 5,851,023 A * | 12/1998 | Nagata et al. | 280/728.3 |
| 5,887,891 A * | 3/1999 | Taquchi et al. | 280/728.2 |
| 6,120,055 A * | 9/2000 | Cuevas et al. | 280/728.2 |
| 6,126,191 A * | 10/2000 | Pepperine et al. | 280/728.2 |
| 6,286,858 B1 * | 9/2001 | Shepherd et al. | 280/728.2 |
| 6,354,621 B1 * | 3/2002 | Zimmerbeutel et al. | 280/728.2 |
| 6,422,589 B1 * | 7/2002 | Ostermann et al. | 280/728.2 |
| 6,481,742 B2 * | 11/2002 | Usami et al. | 280/728.2 |
| 6,767,030 B2 * | 7/2004 | Yamaji et al. | 280/740 |
| 7,052,036 B2 * | 5/2006 | Lee et al. | 280/728.3 |

OTHER PUBLICATIONS

U.S. Appl. No. 12/457,100, filed Jun. 1, 2009, Mogg et al.

* cited by examiner

*Primary Examiner* — Toan C To
(74) *Attorney, Agent, or Firm* — Foley and Lardner LLP

(57) ABSTRACT

An airbag assembly for use within a vehicle. The airbag assembly includes an airbag, an inflator configured to provide a gas to inflate the airbag and a housing with an inflator receiving portion and an upper mounting portion. The inflator receiving portion includes a cavity in which the inflator and the airbag are stored. The upper mounting portion is configured to mount a first side of the airbag housing to a cover. The inflator receiving portion and the upper mounting portion are integrated together in a single, unitary piece.

11 Claims, 4 Drawing Sheets

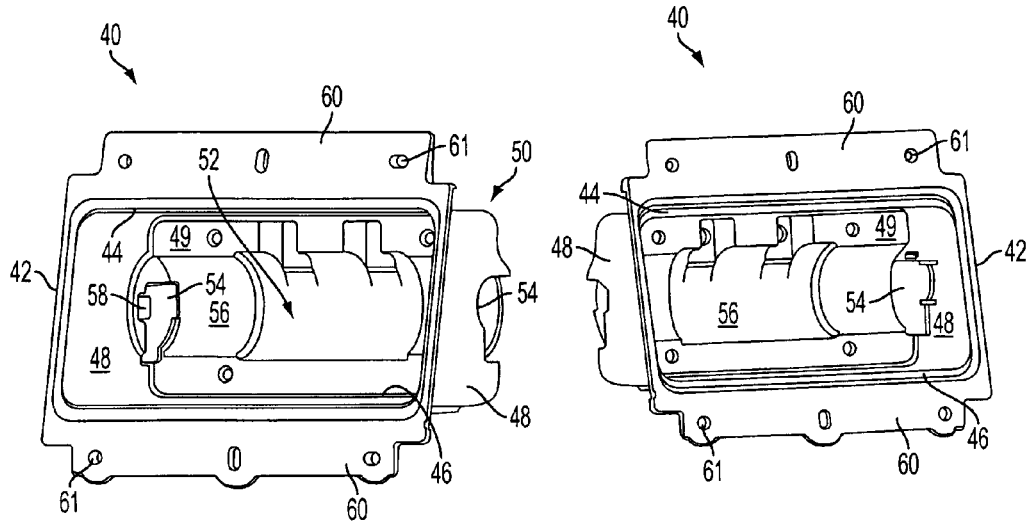
FIG. 7
FIG. 8
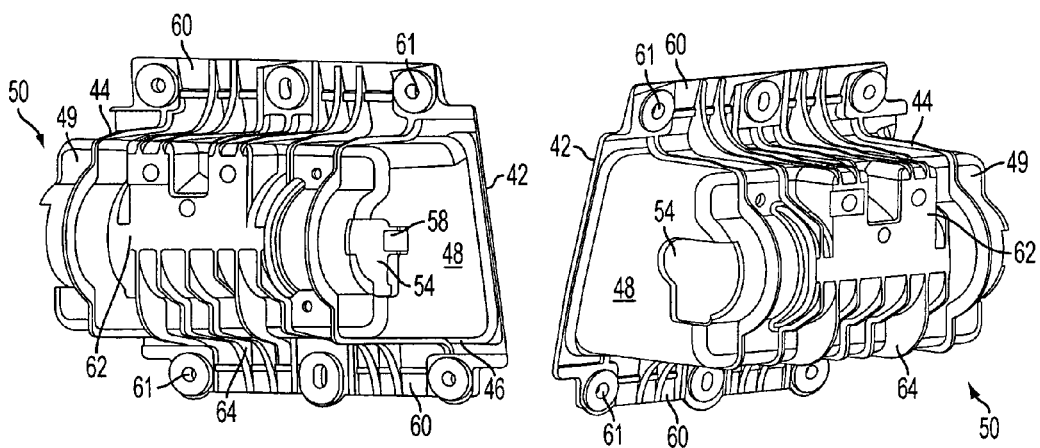
FIG. 9
FIG. 10

AIRBAG ASSEMBLY

BACKGROUND

The present application relates generally to the field of vehicle airbags which provide occupant protection when deployed (e.g., during a dynamic vehicle impact event). More specifically, the application relates to an improved airbag constructed with an improved housing for coupling to a motor vehicle.

Airbags are located in vehicles to protect occupants from injury during a vehicle dynamic impact event, which triggers sensors located in the vehicle to initiate deployment of airbags. An airbag may deploy and inflate, by gas rapidly entering the airbag; typically through the use of an inflator containing an explosive charge (e.g., pyrotechnic device). A passenger airbag is typically stored within a housing coupled to a portion of the vehicle and is typically packaged through a process of folding and rolling to compact the airbag in order to minimize its required packaging space. During a vehicle dynamic impact event, a passenger airbag may deploy from the upper portion (e.g., above the glove box) of the dashboard, in substantially rearward and upward directions to protect the torso and head of the occupant, while the knee airbag deploys, typically from the lower portion (e.g., below the glove box) of the dashboard to protect the knees and legs of the occupant. Driver side airbags are typically stored within the steering wheel and deploy substantially rearward toward the occupant.

In conventional airbag housings, the housings are made from steel. Steel housings have a relatively high mass and weight. Steel housings are made having relatively thin wall thicknesses, but the high density of steel creates a heavy airbag housing.

The geometry of a steel airbag housing is limited by the method of manufacture, which typically is stamping through a progressive die set. To incorporate additional features into a steel airbag housing requires the coupling of other components through fastening or welding, which is expensive and further increases the mass of the housing.

A conventional airbag housing 100 made from steel is shown in FIG. 1. The airbag housing 100 is coupled to an upper mounting portion 102 with a pair of brackets 104. The upper mounting portion 102 is coupled to a cover 125. A cross-vehicle bracket 106 is provided to couple the housing 100 to a vehicle. The cross-vehicle bracket 106 is, in turn, coupled to the housing with an L-shaped bracket 108. An inflator 132 is inserted through the side of the housing 100 to rest in the housing 100. A slide bracket 110 is coupled to the housing 100 to prevent the inflator 132 from sliding out of the housing 100. The large number of separate brackets and other metal components increases the cost, weight, and assembly time of the airbag assembly.

It would be advantageous to provide an airbag housing for a vehicle with a reduced number of components and having a relatively low mass and weight.

SUMMARY

One disclosed embodiment relates to an airbag assembly or module for use within a vehicle. The airbag assembly includes an airbag; an inflator configured to provide a gas to inflate the airbag; and a housing with an inflator receiving portion and an upper mounting portion. The inflator receiving portion includes a cavity in which the inflator and the airbag are stored. The upper mounting portion is configured to mount a first side of the airbag housing to a cover. The inflator receiving portion and the upper mounting portion are integrated together in a single, unitary piece.

It is to be understood that both the foregoing general description and the following detailed description are exemplary and explanatory only, and are not restrictive of the embodiments as claimed.

BRIEF DESCRIPTION OF THE DRAWINGS

These and other features, aspects, and advantages of the present embodiments will become apparent from the following description, appended claims, and the accompanying exemplary embodiments shown in the drawings, which are briefly described below.

FIGS. 7 and 8 are front views of a housing for the airbag assembly of FIG. 4 according to an exemplary embodiment.

FIGS. 9 and 10 are rear views of a housing for the airbag assembly of FIG. 4 according to an exemplary embodiment.

DETAILED DESCRIPTION

Figure 2:
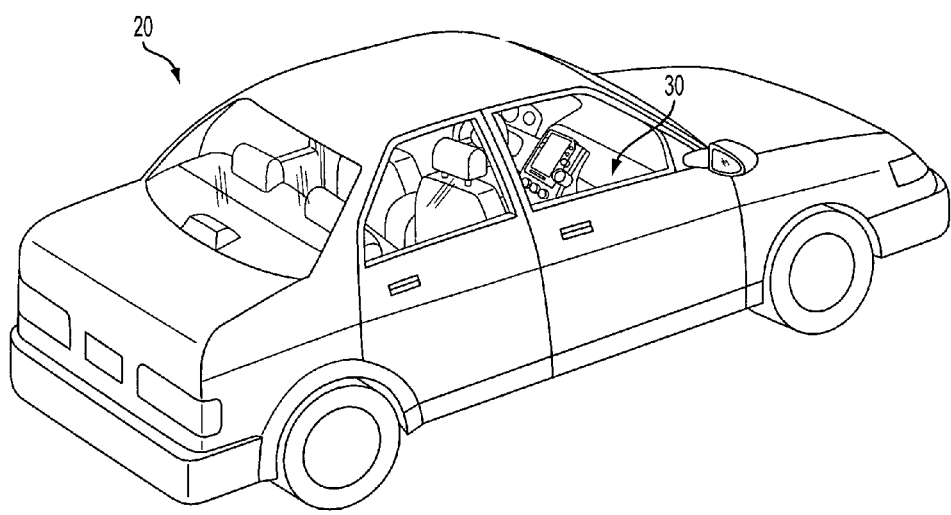
FIG. 2 is a perspective view of a vehicle including an airbag assembly.

Referring to FIG. 2, an exemplary embodiment of a motor vehicle 20 is illustrated. The vehicle 20 includes an airbag assembly 30. The vehicle 20 is illustrated as a typical sedan, but an airbag system as disclosed in this application may be used on any type of passenger vehicle as well as other moving vehicles that offer occupant protection to seated passengers in the form of inflatable safety systems which include an airbag assembly or an inflatable protection device.

Figure 3:
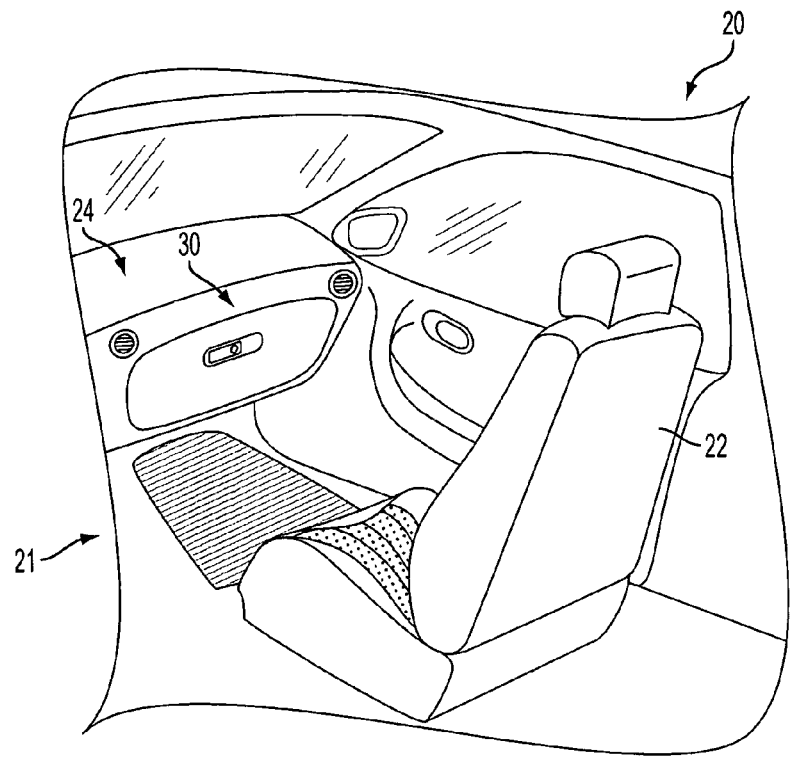
FIG. 3 is a perspective view of a portion of an interior passenger compartment of a vehicle, such as the vehicle of FIG. 1, showing a placement of an airbag assembly in the vehicle dash board according to an exemplary embodiment.
Figure 4:
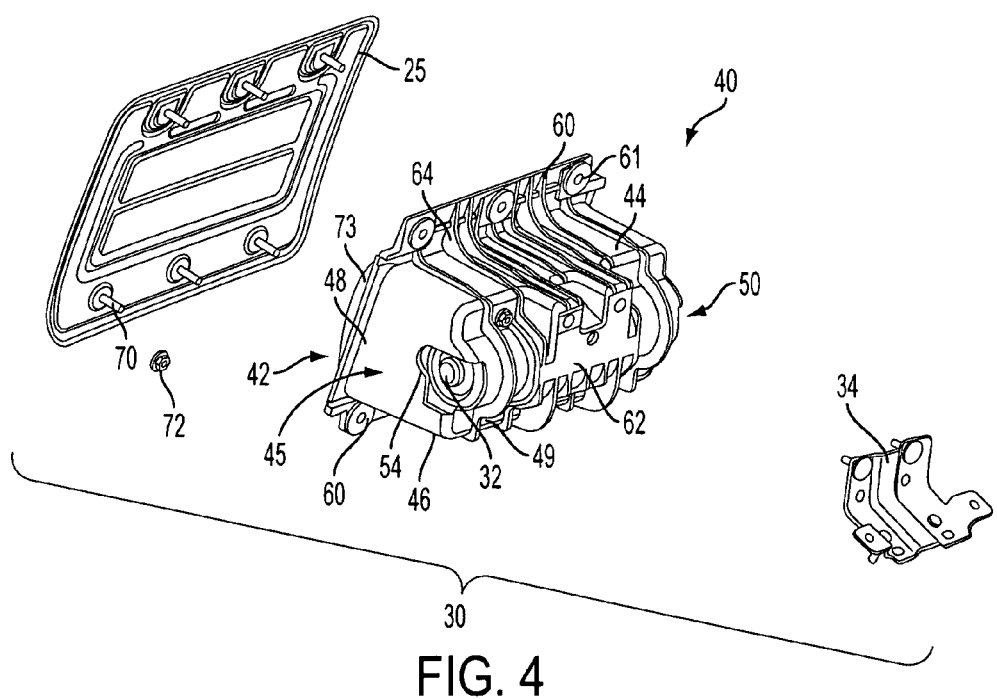
FIG. 4 is an exploded side elevational view of an airbag assembly according to an exemplary embodiment.
Figure 5:
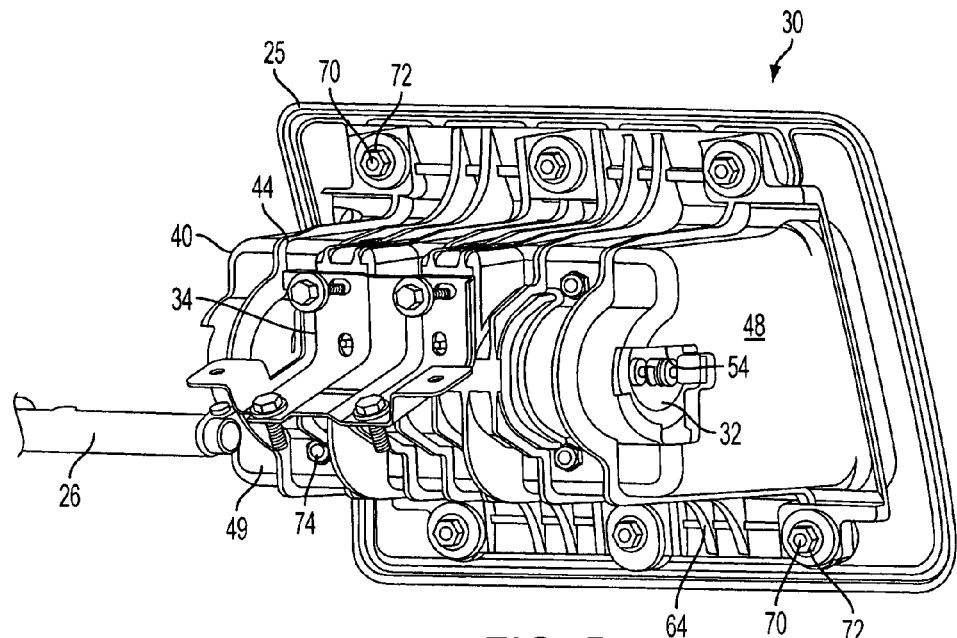
FIGS. 5 and 6 are rear views of the airbag assembly of FIG. 4 according to an exemplary embodiment.
Figure 6:
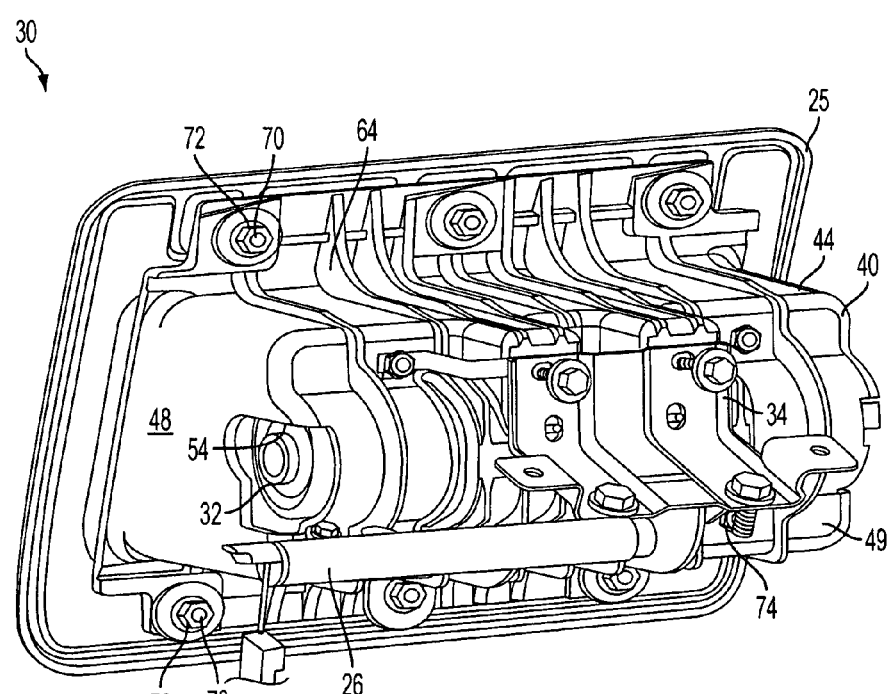

An exemplary embodiment of a portion of the interior of a passenger compartment 21 of the vehicle 20 of FIG. 2, is illustrated in FIG. 3. The vehicle 20 includes a dashboard assembly 24, a passenger seat assembly 22 and an airbag assembly 30. The airbag assembly 30 may be integrated within the dashboard assembly 24 and may be configured to fit within the unique packaging requirements of the vehicle 20. According to other embodiments, the airbag assembly 30 may be configured within a glove box assembly or in other locations within the vehicle 20 such as beneath trim panels along the roof rail, trim panels along the vertical pillars (e.g., the A-pillar, B-pillar, and C-pillar), with the seat assembly 22, etc. The airbag assembly 30 is flexibly configurable for use in varying package requirements, and may be tailored to satisfy specific needs of the vehicle manufacturer. It should be noted that although FIG. 3 illustrates the passenger side of the interior passenger compartment 21 of the vehicle 20, the embodiments disclosed in this application are configurable for driver side airbag assemblies, side curtain airbag assemblies, seat mounted side impact airbag assemblies, knee airbag assemblies, or any inflatable protection device for any vehicle.

Referring now to FIGS. 4-10, the airbag assembly 30 is shown according to an exemplary embodiment. The airbag assembly 30 includes an airbag 73, an inflator 32 to inflate the airbag 73, and a housing 40. The airbag assembly 30 is generally coupled to a rigid member on the vehicle. The airbag assembly 30 is a passenger airbag assembly and is coupled to a frame member 26 within the vehicle dash assembly 24. In other exemplary embodiments, the airbag assembly 30 may be adapted to be another type of airbag assembly, such as a side airbag assembly or a curtain airbag assembly, and may be configured to couple to a rigid member beside the frame member 26 such as, for example, the vehicle roof rail, the A-pillar, the B-pillar, the C-pillar or the vehicle seat frame.

The airbag 73 is stored within the housing 40 and is folded and rolled so that the airbag 73 is compact, as to minimize the required packaging space for the airbag 73. The airbag 73 is typically formed from multiple fabric panels that are sewn or otherwise fastened together. The airbag 73 may be shaped differently depending on the application and placement of the airbag assembly 30 (e.g., a front impact airbag, a side impact airbag, a curtain airbag, etc.).

The inflator 32 inflates the airbag 73 during a vehicle dynamic impact event. During a vehicle dynamic impact event, sensors located in the vehicle 20 provide input to a controller that controls the initiation of the inflator 32. When a vehicle collision or other dynamic impact event is detected, the inflator 32 generates to generate a gas to inflate the airbag 73. The inflator 32 may be one of various available alternatives such as, for example, pyrotechnic, stored gas, hybrid, etc. The inflator 32 may be a single stage inflator or a dual stage inflator. According to an exemplary embodiment, the inflator 32 is generally cylindrically shaped. Other shapes of the inflator 32 are also possible. An intermediate component such as a diffuser (not shown) may be provided between the inflator 32 and the airbag 73. The diffuser directs inflation gas entering the airbag 73, to aid in deployment of the airbag 73. As the inflator 32 inflates the airbag 73, the airbag 73 deploys out of the housing 40 and into the interior of the vehicle, between the occupant of the vehicle and a rigid body in the vehicle, such as the vehicle dash assembly 24. The airbag 73 is configured to protect an occupant by cushioning the impact of the occupant during a collision.

Figure 1:
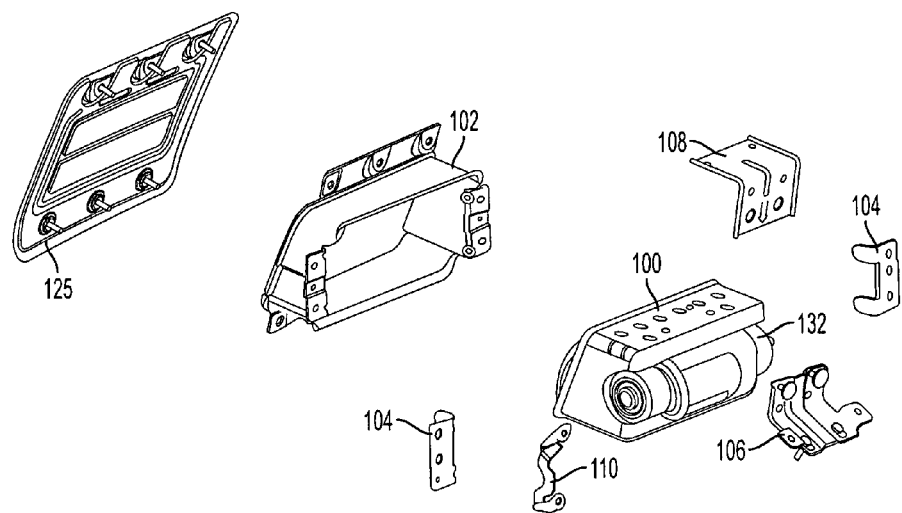
FIG. 1 is an exploded side elevational view of a conventional airbag assembly including stamped metal components.

The housing 40 is a single, unitary body formed from a material capable of being molded or manufactured as a single unitary piece, such as, for example, a polymer. According to one exemplary embodiment, the housing 40 is made from a glass-filled polymer composite. In other embodiments, other suitable polymers may be used. Glass fibers may be introduced into the polymer during an injection molding process. The glass filled polymer composite may be, for example, nylon. One exemplary nylon material is commercially available under the name Zytel™ by DuPont. According to other exemplary embodiments, the polymer may be any suitable type of plastic material. The single, unitary housing 40 provides the same or better functionality provided by a conventional steel housing, as shown in FIG. 1. However, the conventional steel housing includes multiple separate components.

By forming the housing 40 of a plastic instead of stamped metal, several advantages are realized. A plastic housing 40 may be formed such that it performs the same function as several stamped metal components and brackets. For instance, by providing integrally formed mounting flanges 60 on the housing 40, the need for a separate upper mounting portion as shown in FIG. 1 is eliminated. The housing 40 may then be coupled directly to the cover 25 rather than being first coupled to a upper mounting portion, and then coupling the upper mounting portion 45 to the cover. The ability of the housing 40 to be connected directly to the cover 25 reduces the amount of fasteners needed to assemble the airbag assembly 30 and reduces the number of steps and the time needed to assemble the airbag assembly 30. Further, a one-piece housing 40 that is formed from a plastic may weigh less than a similar conventional housing formed from stamped metal pieces.

The housing 40 is formed with a first end 42 that is open, a top wall 44, a bottom wall 46, two opposing side walls 48, and a second end 50 comprising a back wall 49. The first end 42 is coupled to the body behind which the airbag assembly 30 is concealed (e.g., the cover 25), while the second end 50 is coupled to a rigid body such as a vehicle frame member 26 with a mounting mechanism, such as a mounting bracket 34.

The housing 40 may be formed to include ribs 64 or other supporting features. The ribs 64 help to strengthen or stabilize the housing 40 without increasing the overall wall thickness of the housing 40, thereby reducing the weight of the housing 40 and the amount of material needed to form the housing 40 as compared to conventional steel housings. While ribs 64 are shown formed on the top wall 44 and the bottom wall 46, according to other exemplary embodiments, ribs 64 may be formed on the side walls 48. Ribs 64 may also be included on the interior of the housing 40 such as in an inflator receiving portion 52. It should be noted that the housing is not limited to the quantity or the position of the ribs as shown, as the ribs may be tailored to specific applications.

The housing 40 may include a inflator receiving portion 52 and an upper mounting portion 45. The inflator receiving portion 52 includes a cavity 56 in which the inflator 32 and the airbag 73 are stored. Specifically, the inflator 32 may be connected to the airbag 73 (e.g., with a retaining ring) and then the assembled inflator 32 and airbag 73 may be inserted into the housing 40 through the first end 42 to be received in the inflator receiving portion 52. The inflator receiving portion 52 is defined by side walls (not shown) and the back wall 49 proximate to the second end 50 of the housing 40. The back wall 49 forms the cavity 56 into which the inflator 32 rests. Openings 54 are formed in the side walls on either end of the cavity 56. The openings 54 are smaller than the diameter of the inflator 32, preventing the inflator 32 from sliding out of the housing 40 through either of the openings 54. By inserting the inflator 32 through the open first end 42, and because the openings 54 are smaller than the diameter of the inflator 32, a slide bracket 110, such as used in the conventional airbag assembly shown in FIG. 1, is not needed to keep the inflator 32 from sliding out of the housing 40. The shape of the cavity 56 may be semi-cylindrical or any other suitable shape capable of receiving the inflator 32.

The inflator receiving portion 52 may include a tab 58 proximate to one of the openings 54. The tab functions to properly orient the inflator 32 in the inflator receiving portion 52. According to an exemplary embodiment, once the inflator 32 is received in the inflator receiving portion 52, the inflator 32 is rotated such that the tab 58 engages a flap on the outer diameter of the inflator 32 to ensure that the inflator 32 is correctly oriented. Because the deployment of the airbag 73 may require gas to be output by the inflator 32 at a predetermined angle, a proper orientation of the inflator 32 may facilitate an improved deployment of the airbag 73.

The upper mounting portion 45 is configured to mount a first side of the airbag housing 40 to the cover 25. The upper mounting portion 45 is defined by the first end 42, the top wall 44, the bottom wall 46, and the two opposing side walls 48. At least a portion of the upper mounting portion 45 surrounds the inflator receiving portion 52. For example, the upper mounting portion 45 may surround the side walls of the inflator receiving portion 52.

The first end 42 of the housing 40 may include one or more outwardly extending flanges 60 that facilitate the mounting of the airbag assembly 30 to a cover 25 that is integrated with a vehicle trim component, such as the instrument panel 24. The flanges 60 may extend outward from the top wall 44 and the bottom wall 46 around the open first end 42 of the housing 40. Each flange 60 may include several openings 61 that receive fastening members 70 (e.g., threaded studs). Such fastening members 70 may be integrally formed with the cover 25, coupled to the cover 25 (e.g., with an adhesive, welding, etc.) or inserted through openings in the cover 25. The airbag assembly 30 is positioned such that the fastening members 70 extend through the openings 61 in the flanges 60. Each fastener 70, may be coupled with a corresponding nut 72 or other suitable fasteners, which connect the airbag assembly 30 to the cover 25. The openings 61 in the flanges 60 may be shaped to allow for the housing 40 and airbag assembly 30 to be mounted while compensating for tolerances in the instrument panel 24. For instance, one or more of the openings 61 may be oversized holes or may be slots (e.g., horizontal slots or vertical slots). By providing integrally formed flanges 60 on the housing, the upper mounting portion 102 of the conventional airbag assembly, as shown in FIG. 1, is not needed to couple the housing 40 to the cover 25. Likewise, the brackets 104 used to couple the stamped metal housing 100 to the upper mounting portion 102, of the conventional airbag assembly, may also be eliminated.

The first end 42 of the housing 40 may also include other integrally formed features that allow the housing 40 to be coupled to the cover 25. For instance, the housing 40 may include arms or other extensions that engage sockets in the cover 25 to couple the housing 40 to the cover 25 with a snap fit.

The back wall 49 of the housing 40 may include a lower mounting portion 62. The lower mounting portion 62 provides a place for the cross-vehicle brace 34 to be mounted. The brace 34 couples the housing 40 to a rigid member in the vehicle such as the frame member 26. According to an exemplary embodiment, the cross-vehicle bracket 34 is coupled to the housing with several threaded fasteners 170 (e.g., bolts). By providing a lower mounting portion 62 for the cross-vehicle bracket 34 directly on the housing 40, a separate L-shaped bracket 108, as used in the conventional airbag assembly shown in FIG. 1, is not needed. The airbag housing 40 may be adapted to be used in different vehicles by providing a different cross-vehicle bracket 34 configured to couple the housing 40 to a suitable frame member.

As utilized herein, the terms "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the recited claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

The construction and arrangements of the airbag assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An airbag assembly for use within a vehicle, comprising:
   an airbag;
   an inflator configured to provide gas to inflate the airbag; and
   a housing that includes:
      a inflator receiving portion that includes a cavity in which the inflator and the airbag are stored; and
      an upper mounting portion configured to mount a first side of the housing to a vehicle cover,
   wherein an upper side of the upper mounting portion includes a mounting flange that extends outwards from side walls of the upper mounting portion and extends around the entire circumference of the upper mounting portion and that is configured to abut a bottom surface of the vehicle cover when the housing is mounted to the vehicle cover, and
   wherein the inflator receiving portion and the upper mounting portion are integrated together in a single, unitary piece.

2. The airbag assembly of claim 1, wherein the housing comprises a plastic.

3. The airbag assembly of claim 1, wherein the housing comprises a glass fiber reinforced polymer.

4. The airbag assembly of claim 1, wherein the inflator receiving portion includes a first opening and a second opening, and wherein the inflator is positioned between the first opening and the second opening.

5. The airbag assembly of claim 4, wherein the inflator is cylindrically shaped and wherein the diameter of the first opening and the diameter of the second opening are smaller than the diameter of the inflator.

6. The airbag assembly of claim 1, wherein the airbag is configured to deploy in a position to protect a passenger of the vehicle.

7. The airbag assembly of claim 1, wherein the housing further includes ribs configured to strengthen or stabilize the housing.

8. The airbag assembly of claim 7, wherein the ribs may be located on one or more of a top wall, bottom wall, side walls, and interior of the housing.

9. The airbag assembly of claim 7, wherein the ribs are on the interior of the housing.

10. The airbag assembly of claim 1, wherein the vehicle cover includes openings and the mounting flange includes openings that coincide with the openings of the vehicle cover.

11. The airbag assembly of claim 10, wherein the openings of the vehicle cover and the openings of the mounting flange are configured to receive fasteners.

* * * * *